United States Patent Office 3,248,350
Patented Apr. 26, 1966

3,248,350
WATER INSOLUBLE COATING OF METHYL VINYL ETHER-MALEIC ANHYDRIDE COPOLYMER, HYDROXYETHYL CELLULOSE AND PHOSPHORIC ACID
Ann M. Triggle, Buffalo, N.Y., assignor to Hooker Chemical Corporation, Niagara Falls, N.Y., a corporation of New York
No Drawing. Filed Sept. 11, 1963, Ser. No. 308,099
Claims priority, application Great Britain, Sept. 14, 1962, 35,136/62
11 Claims. (Cl. 260—17)

The present invention broadly relates to an improved coating composition and more particularly to an improved aqueous coating composition incorporating a controlled portion of a film-forming resin therein and active phosphate ions which has good wetting properties and forms adherent corrosion resistant coatings on metal surfaces.

It is a principal object of the present invention to provide an improved aqueous coating composition incorporating active phosphate ions and a synthetic resin which provides for improved adherent corrosion resistant coatings on metallic surfaces and particularly on ferrous and zinc surfaces such as hot dipped galvanized surfaces in comparison to coating compositions of similar type heretofore known.

Another object of the present invention is to provide an improved aqueous coating composition comprising a clear and stable aqueous solution which is of a viscosity enabling its application by anyone of the conventional techniques known in the art such as spraying, brushing, dipping, or flooding and which coatings on subsequent drying are tenaciously bonded to the underlying substrate.

Still another object of the present invention is to provide an improved aqueous coating composition for metallic surfaces enhancing the corrosion resistance thereof and which composition is characterized in its ease of formulation, versatility of application, excellent wetting characteristics, good adhesion properties, good stability, and its economy of manufacture and use.

The foregoing and other objects and advantages of the present invention are achieved by formulating an aqueous coating composition comprising controlled proportions of a copolymer of maleic anhydride and methyl vinyl ether, and hydroxyethyl cellulose in addition to from about 1% to about 3% by weight of phosphoric acid or its equivalent and wherein the quantities of the copolymer and hydroxyethyl cellulose are controlled so as to render a resultant solution having a viscosity broadly ranging from about 50 to about 100 centipoises, and preferably from about 57 to about 80 centipoises. The solution may also contain within the scope of the present invention controlled proportions of wetting agents to further enhance the wetting characteristics of the aqueous coating composition toward metal surfaces to which it is applied. Additionally, controlled amounts conventionally ranging from about 1% to about 5% by weight calculated as $CrO_3$ of hexavalent chromium compounds may additionally be added to further enhance the corrosion protection of the resultant coating as well as inhibiting incipient corrosion prior to the drying of the aqueous coating solution on the metal substrate. A further preferred embodiment of the aqueous coating formulation comprising the present invention includes the addition of controlled proportions of condensed phosphates such as alkali metal pyrophosphates, for example, which accelerate the drying and curing characteristics of the resin constituents in the coating composition.

Further advantages of the aqueous coating composition comprising the present invention will become apparent on a reading of the following description and the examples provided illustrating typical coating compositions within the scope of the present invention. It will be understood that the proportions of the constituents comprising the improved aqueous coating composition as described herein and as set forth in the subjoined claims are expressed in terms of percentages by weight unless otherwise specified. The term "alkali metal" as used herein is employed in its broad sense to include sodium, potassium, lithium as well as ammonium.

The synthetic resin constituents of the aqueous coating composition comprise a water-soluble polyhydroxy compound and the copolymer of maleic anhydride and an aliphatic vinyl ether compound. It has been discovered that a clear, stable aqueous solution can be obtained employing the copolymer of maleic anhydride and methyl vinyl ether in addition, a controlled proportion of hydroxyethyl cellulose in addition to the active phosphate ions producing a solution which can be readily applied to metal surfaces and on subsequent drying or curing forms a tightly adherent, water-insoluble cross-linked protective coating. An important feature of the aqueous coating solution is that it possesses good stability and does not gel upon standing for a period of several days which substantially extends its useful shelf life.

It is another important feature of the present invention that the aqueous coating solution provides for effective wetting of the metal surface to which it is applied. This is particularly important in the case of ferrous surfaces with which the phosphoric acid constituent thereof reacts to form a protective coating of iron phosphate thereon. The excellent wetting characteristics of the coating solution are achieved by effecting a careful control of the viscosity of the solution. While aqueous solutions containing ethyl vinyl ether-maleic anhydride copolymer and hydroxyethyl cellulose were found effectively wet a metal surface over only a relatively limited range of viscosities, the inclusion of phosphoric acid in the solution provides for a surprisingly large increase in the range of viscosity of the solution for achieving efficient surface wetting. For the purposes of the present invention it has been found that the aqueous coating solutions should be controlled in viscosity from about 50 to about 100 centipoises and preferably from about 57 to about 80 centipoises.

While various aliphatic vinyl compounds copolymerized with maleic anhydride form water soluble copolymers, the copolymerization product of methyl vinyl ether and maleic anhydride have been found particularly suitable for this purpose and this copolymer constitutes the preferred material. The copolymer is a linear polymeric anhydride comprising an interpolymer of methyl vinyl ether and maleic anhydride at a 1:1 molar ratio. For the purposes of the present invention, the copolymer is controlled in molecular weight so as to have a specific viscosity of from about 0.1 up to about 3.5 as determined on a 1% solution of the copolymer in methyl ethyl ketone at 25° C. The polyhydroxy constituent of the aqueous coating composition which is reactive with the copolymer to form a water insoluble film comprises hydroxyethyl cellulose which may vary in molecular size from molecules of relatively low molecular weight to macromolecules of high molecular weight as indicated by a viscosity ranging from about 10 up to about 3000 centipoises of aqueous solutions containing 2% hydroxyethyl cellulose measured at 25° C.

The proportions of the copolymer of methyl vinyl ether and maleic anhydride and the hydroxyethyl cellulose are controlled so as to provide coreaction therebetween forming a cross-linked water insoluble resin film which is tightly adherent to the metal surface to which it is applied and are controlled in amounts so as to produce a resultant viscosity of the aqueous solution of from about 50 to about 100 centipoises, and preferably from about 57 to 80 centipoises. The specific quantities of the copolymer and the hydroxyethyl cellulose constituents in the solution depends upon the average molecular weight of these constituents. The copolymer can be employed within a range of from about 0.75% to about 2% when of a medium molecular weight copolymer as defined by its specific viscosity of from about 1.0 to about 1.4 is used while the hydroxyethyl cellulose may be employed in amounts from about 0.25% up to about 3% by weight. Mixtures of the copolymer and hydroxyethyl cellulose of different molecular weights can be employed providing that the resultant viscosity of the solution is within the aforementioned range to provide the requisite wetting characteristics.

In addition to the resin constituents, the aqueous coating solution contains from about 1% to about 3% by weight of phosphoric acid. Further improvement in the wetting characteristic of the solution can be achieved by employing from about 0.1% up to about 0.5% of suitable wetting agents of the types well known in the art. While cationic and anionic wetting agents can be employed, they are less suitable than non-ionic wetting agents since it has been found they have a tendency to cause incipient corrosion at the edges of a ferrous surface coated with the solution. Accordingly, non-ionic wetting agents such as the ethylene oxide condensate of nonyl phenol containing 10 ethylene oxide units and employed in an amount from about 0.1% to about 0.5% in the coating solution can be satisfactorily employed for enhancing the wetting characteristics of the coating composition.

The aqueous coating solution having a viscosity within the aforementioned range may be satisfactorily applied to a metal surface by any conventional method such as spraying, brushing, dipping, flooding, or the like. After allowing any excess of the solution to drain from the metal surface, the coating is preferably allowed to dry and is subsequently heated such as by placing the coated article in a heated chamber or oven to effect the cross-linking reaction between the methyl vinyl ether-maleic anhydride copolymer and the hydroxy ethyl cellulose resulting in a water-insoluble adherent film.

It has been found, particularly in connection with the coating of ferrous surfaces, that if the coated metal article is not subjected to an elevated temperature within about 30 seconds after the application of the aqueous coating solution thereto, incipient rusting of the ferrous metal substrate may occur. It has been discovered, however, that if a small proportion of a water-soluble hexavalent chromium compound, such as chromic acid, or the alkali metal chromates and dichromates including the chromates and dichromates of sodium, potassium, and ammonium, for example, is incorporated in the solution, then the period between the application of the coating solution and the curing of the coating can be extended considerably. The inclusion of such chromates or dichromates has enabled extensions as long as one or two weeks between the application of the coating and its curing without the presence of any incipient corrosion on the surface of the metal substrate. The inclusion of such hexavalent chromium compounds has also been found to provide a still further improvement in the corrosion protection provided by the coating composition. Chromic acid in the aqueous coating solution in amounts ranging from about 1% to about 5% calculated as $CrO_3$ has been found effective for this purpose. The use of ammonium dichromate is particularly desirable since a smaller quantity of this material produces the equivalent effect; for example, about 1% to about 3% generally being sufficient. Ammonium dichromate is more desirable than other alkali metal dichromates such as, for example, sodium dichromate since ammonium dichromate decomposes during the heat curing of the coating leaving no water-soluble residues.

The aqueous coating solution containing the resin forming constituents and phosphoric acid with or without the wetting agent and hexavalent chromium compound has been found to require curing cycles for substantial periods at elevated temperatures in order to complete the cross-linking reaction producing a water-insoluble adherent film. In the interest of achieving greater efficiency and economy of operation, it is most desirable to accelerate the cross-linking reaction. In accordance with a further discovery comprising the present invention, it has been surprisingly found that the inclusion of a water-soluble condensed phosphate in the coating solution effects a substantial acceleration in the cross-linking reaction. Condensed phosphates suitable for this purpose include the alkali metal salts and zinc salts of pyrophosphate, hexametaphosphate, tripolyphosphate, as well as mixtures thereof. The alkali metal pyrophosphates have good accelerating action while zinc pyrophosphate is even more effective requiring relatively smaller quantities for providing the same degree of acceleration. Conventionally, concentrations of the alkali metal pyrophosphates which may be suitably employed range from about 0.1% to about 1.5% while equivalent results are obtained with from about 0.05% to about 0.5% by weight of zinc pyrophosphate. No significant improvement in the acceleration effect is obtained when employing quantities in excess of those set forth above. While both sodium hexametaphosphate and sodium tripolyphosphate, for example, also have an accelerating effect, considerably high concentrations thereof are necessary to provide an accelerating effect equivalent to the pyrophosphates, and accordingly, these condensed phosphates are less desirable than the pyrophosphate.

In order to further illustrate the improved aqueous coating solution comprising the present invention, the following examples are provided. It will be understood, however, that the examples are included for illustrative purposes and are not intended to be limiting of the scope of the invention as set forth in the subjoined claims.

*Example 1*

An aqueous coating composition was prepared in accordance with a preferred practice of the present invention comprising the following constituents.

| Ingredient: | Amount, percent |
| --- | --- |
| Methyl vinyl ether-maleic anhydride copolymer (molecular weight corresponding to specific viscosity of about 1.0 to 1.4) | 1.0 |
| Hydroxyethyl cellulose (molecular weight corresponding to viscosity of about 3000 cps. 2% aqueous solution at 25° C.) | 0.5 |
| Ammonium dichromate | 1.0 |
| Phosphoric acid | 2.0 |
| Wetting agent (ethylene oxide condensate of nonyl phenol containing 10 ethylene oxide units) | 0.2 |

The solution containing the constituents as set forth above had a viscosity of 60 centipoises. In order to illustrate the accelerating effect of the inclusion of condensed phosphates on the curing conditions necessary to produce adherent water-insoluble films, varying amounts of sodium pyrophosphate decahydrate were employed in the foregoing solution. The following results were obtained:

| Quantity of sodium pyrophosphate decahydrate ($Na_4P_2O_7 \cdot 10H_2O$): | Curing conditions |
| --- | --- |
| 0% | 480° F. for 5 minutes. |
| 0.1% | 250° F. for 30 minutes. |
| 0.5% | 180° F. for 15 minutes. |
| 1.0% | 120° F. for 30 minutes. |
| 1.5% | 120° F. for 15 minutes. |

It was also observed that when 0.5% of sodium pyrophosphate was employed in the solution, the coatings became water-insoluble at room temperature after 12 hours.

When 0.1% of zinc pyrophosphate was employed instead of sodium pyrophosphate, water-insoluble films were produced in 3 hours at room temperature.

In addition to the foregoing formulation, alternative suitable aqueous coating compositions prepared in accordance with the present invention are set forth in the following examples. The copolymer of methyl vinyl ether-maleic anhydride and hydroxy ethyl cellulose employed correspond to that disclosed in Example 1. In addition, the non-ionic wetting agent is similar to that employed in Example 1. Moreover, the sodium and zinc pyrophosphate constituents as set forth in these examples can be interchanged, that is, about 0.1% of zinc pyrophosphate being equivalent to about 0.5% of sodium pyrophosphate.

*Example 2*

| Ingredient: | Amount, percent |
| --- | --- |
| Copolymer | 0.75 |
| Hydroxyethyl cellulose | 0.75 |
| Ammonium dichromate | 1 |
| Phosphoric acid | 2 |
| Wetting agent | 0.2 |
| Sodium pyrophosphate | 0.5 |

The resultant aqueous solution had a viscosity of 66 centipoises.

*Example 3*

| Ingredient: | Amount, percent |
| --- | --- |
| Copolymer | 1 |
| Hydroxyethyl cellulose | 0.25 |
| Ammonium dichromate | 1 |
| Phosphoric acid | 2 |
| Wetting agent | 0.2 |
| Zinc pyrophosphate | 0.1 |

The resultant aqueous coating solution had a viscosity of 50 centipoises.

*Example 4*

| Ingredient: | Amount, percent |
| --- | --- |
| Copolymer | 2 |
| Hydroxyethyl cellulose | 0.5 |
| Ammonium dichromate | 1 |
| Phosphoric acid | 2 |
| Wetting agent | 0.2 |
| Sodium pyrophosphate | 0.5 |

The resultant aqueous coating composition had a viscosity of about 70 centipoises.

*Example 5*

| Ingredient: | Amount, percent |
| --- | --- |
| Copolymer | 0.5 |
| Hydroxyethyl cellulose | 1.25 |
| Ammonium dichromate | 1 |
| Phosphoric acid | 2 |
| Wetting agent | 0.2 |
| Zinc pyrophosphate | 0.1 |

The resultant aqueous coating solution had a viscosity of about 100 centipoises.

*Example 6*

| Ingredient: | Amount, percent |
| --- | --- |
| Copolymers | 0.5 |
| Hydroxyethyl cellulose | 1 |
| Ammonium dichromate | 1 |
| Phosphoric acid | 2 |
| Wetting agent | 0.2 |
| Zinc pyrophosphate | 0.1 |

The resultant aqueous coating composition had a viscosity of 80 centipoises.

While it will be apparent that the preferred embodiments herein illustrated are well calculated to fulfill the objects above states, it will be appreciated that the invention is susceptible to modification, variation and change without departing from the proper scope or fair meaning of the subjoined claims.

What is claimed is:

1. An improved coating composition for forming adherent water-insoluble corrosion resistant coatings on metallic surfaces comprising an aqueous solution containing a mixture of hydroxyethyl cellulose and a copolymer of methyl vinyl ether and maleic anhydride present in an amount to produce a viscosity of from about 50 to about 100 centipoises, and from about 1% to about 3% phosphoric acid.

2. An improved coating composition for forming adherent water-insoluble corrosion resistant coatings on metallic surfaces comprising an aqueous solution containing a mixture of hydroxyethyl cellulose and a copolymer of methyl vinyl ether and maleic anhydride present in an amount to produce a viscosity of from about 57 to about 80 centipoises, and from about 1% to about 3% phosphoric acid.

3. An improved coating composition for forming adherent water-insoluble corrosion resistant coatings on metallic surfaces comprising an aqueous solution containing a mixture of hydroxyethyl cellulose in an amount of from about 0.75% to about 2% and a copolymer of methyl vinyl ether and maleic anhydride in an amount of from about 0.25% to about 3% and in the proportion to produce a solution viscosity of from about 50 to about 100 centipoises, and from about 1% to about 3% phosphoric acid.

4. An improved coating composition for forming adherent water-insoluble corrosion resistant coatings on metallic surfaces comprising an aqueous solution containing a mixture of hydroxyethyl cellulose in an amount of from about 0.75% to about 2% and a copolymer of methyl vinyl ether and maleic anhydride in an amount of from about 0.25% to about 3% and in the proportion to produce a solution viscosity of from about 57 to about 80 centipoises, and from about 1% to about 3% phosphoric acid.

5. In an improved coating composition for forming adherent water-insoluble corrosion resistant coatings on metallic surfaces comprising an aqueous solution containing a mixture of hydroxyethyl cellulose and a copolymer of methyl vinyl ether and maleic anhydride present in an amount to produce a viscosity of from about 50 to about 100 centipoises, from about 1% to about 3% phosphoric acid, and a non-ionic wetting agent present in an amount of from about 0.1% to about .5%.

6. An improved coating composition for forming adherent water-insoluble corrosion resistant coatings on metallic surfaces comprising an aqueous solution containing a mixture of hydroxyethyl cellulose and a copolymer of methyl vinyl ether and maleic anhydride present in an amount to produce viscosity of from about 50 to about 100 centipoises, from about 1% to about 3% phosphoric acid, and a water-soluble hexavalent chromium compound selected from the group consisting of chromic acid, chromates and dichromates of the alkali metals, as well as mixtures thereof present in an amount of from about 1% to about 5% calculated as $CrO_3$.

7. An improved composition for forming adherent water-insoluble corrosion resistant coatings on metallic surfaces comprising an aqueous solution containing a mixture of hydroxyethyl cellulose and a copolymer of methyl vinyl ether and maleic anhydride present in an amount to produce a viscosity of from about 57 to about 80 centipoises, from about 1% to about 3% phosphoric acid, and a water-soluble hexavalent chromium compound selected from the group consisting of chromic acid, chromates and dichromates of the alkali metals, as well as mixtures thereof present in an amount of up to about 5% calculated as $CrO_3$.

8. An improved coating composition for forming adherent water-insoluble corrosion resistant coatings on metallic surfaces comprising an aqueous solution containing a mixture of hydroxyethyl cellulose and a copolymer of methyl vinyl ether and maleic anhydride present in an amount to produce a viscosity of from about 50 to about 100 centipoises, from about 1% to about 3% phosphoric acid and a salt of a condensed phosphate selected from the group consisting of alkali metal and zinc pyrophosphates, hexametaphosphates, tripolyphosphates, as well as mixtures thereof present in an amount of from about 0.05% to about 1.5%.

9. An improved coating composition for forming adherent water-insoluble corrosion resistant coatings on metallic surfaces comprising an aqueous solution containing a mixture of hydroxyethyl cellulose and a copolymer of methyl vinyl ether and maleic anhydride present in an amount to produce a viscosity of from about 57 to about 80 centipoises, from about 1% to about 3% phosphoric acid, and a condensed phosphate salt selected from the group consisting of alkali metal and zinc pyrophosphates, hexametaphosphates, tripolyphosphates as well as mixtures thereof present in an amount up to about 1.5%.

10. An improved composition for forming adherent water-insoluble corrosion resistant coatings on metallic surfaces comprising an aqueous solution containing a mixture of hydroxyethyl cellulose in an amount of from about 0.25% to about 3% and a copolymer of methyl vinyl ether and maleic anhydride present in an amount of from about 0.75% to about 2% and in the proportions to produce a solution viscosity of from about 50 to about 100 centipoises, from about 1% to about 3% phosphoric acid, from up to about .5% of a non-ionic wetting agent, up to about 5% calculated as $CrO_3$ of a water-soluble hexavalent chromium compound selected from the group consisting of chromic acid, alkali metal chromates, alkali metal dichromates, as well as mixtures thereof; and up to about 1.5% of a condensed phosphate selected from the group consisting of the alkali metal and zinc pyrophosphates, hexametaphosphates, tripolyphosphates, as well as mixtures thereof.

11. An improved coating composition for forming adherent water-insoluble corrosion resistant coatings on metallic surfaces comprising an aqueous solution containing a mixture of hydroxyethyl cellulose present in an amount from about 0.25% to about 3% and a copolymer of methyl vinyl ether and maleic anhydride present in an amount of from about 0.75% to about 2% and in the proportions to produce a viscosity of from about 57 to about 80 centipoises, from about 1% to about 3% phosphoric acid, up to about .5% of a non-ionic wetting agent, up to about 5% calculated as $CrO_3$ of a water soluble hexavalent chromium compound selected from the group consisting of chromic acid, alkali metal chromates and dichromates, as well as mixtures thereof; and up to about 1.5% of an alkali metal and zinc condensed phosphate selected from a group consisting of pyrophosphates, hexametaphosphates, and tripolyphosphates, as well as mixtures thereof.

No references cited.

WILLIAM H. SHORT, *Primary Examiner.*